United States Patent [19]

Persbeck et al.

[11] Patent Number: 4,513,830
[45] Date of Patent: Apr. 30, 1985

[54] METHOD AND ARRANGEMENT FOR DETERMINATION OF VALUES RELATING TO THE MASS OF A FLOW OF MATERIAL

[75] Inventors: Sven-Eric Persbeck, Torslanda; Bert Almqvist, Göteborg, both of Sweden

[73] Assignee: Utvecklingsaktiebolaget Teccon, Torslanda, Sweden

[21] Appl. No.: 457,586

[22] Filed: Jan. 13, 1983

[30] Foreign Application Priority Data

Jan. 20, 1982 [SE] Sweden .............................. 8200284

[51] Int. Cl.³ ...................... G01G 17/00; G01G 11/14; G01G 13/24
[52] U.S. Cl. .......................................... 177/1; 73/223; 119/14.17; 177/16; 177/25; 177/114
[58] Field of Search ................. 177/1, 25, 16, 90–102, 177/114; 119/14.15, 14.17; 73/219, 223; 222/52, 55

[56] References Cited

U.S. PATENT DOCUMENTS

| | | | |
|---|---|---|---|
| 3,680,649 | 8/1972 | Johnson | 177/99 |
| 3,919,975 | 11/1975 | Duncan | 73/223 X |
| 3,942,562 | 3/1976 | Ridgway et al. | 177/94 X |
| 3,945,532 | 3/1976 | Marks | 222/55 |
| 4,030,356 | 6/1977 | Jaquith | 119/14.17 |
| 4,300,202 | 11/1981 | Chizhikov et al. | 222/52 X |

FOREIGN PATENT DOCUMENTS

| | | | |
|---|---|---|---|
| 208415 | 12/1982 | Japan | 73/219 |
| 679811 | 8/1979 | U.S.S.R. | 177/114 |

Primary Examiner—E. A. Goldberg
Assistant Examiner—Patrick W. Foster

[57] ABSTRACT

A method and apparatus for continuous weighing of a fluid material is described, wherein the material is continuously fed to a weighing container and discharged therefrom, the weighing of the material during filling and the estimated weight thereof during discharge being determined, and by means of a computer, used to generate values which will give the total weight of the material during the entire weighing operation.

4 Claims, 7 Drawing Figures

METHOD AND ARRANGEMENT FOR DETERMINATION OF VALUES RELATING TO THE MASS OF A FLOW OF MATERIAL

The present invention relates to a method and an arrangement for determination of weight relating to the mass of a flow of material through a weighing station.

Occasionally there is a need to record the weight of a material which is subjected to a mass flow. The material concerned can be a liquid or a bulk commodity in for example the form of powder or granulate. Interest can also attach to measuring gaseous substances in a continuous flow. The results of the weighing can relate either to the amount by weight per unit time or the total weight during a certain period of time or during a limited operation, or both, so that it is possible to obtain a record of the magnitude of the flow as a weight per unit time and, after the operation has terminated, the total weight of the material. The need for such weight recording can be encountered during the production or consumption of a substance so that the capacity of the production or consumption unit respectively during a certain unit of time, or as a total during an operation, can be determined and checked. There is also often a need to record the total weight of a material which is transferred in the form of a mass flow from a supplier in order to decide on a payment for the material quantity transferred.

If a comparison is made of the mass of a flow with the measurement of the volume of a flow it will be found that the latter is considerably more simple. A volume measuring arrangement can consist of a measuring position in which the movement of the material past a measuring point having a certain flow area is measured. Here the magnitude of the flow is the area times the rate of movement. If the specific weight of material is know it is simple to convert the volume to weight and this method is widely employed for determination of the weight of liquids. If however it is difficult to establish the specific weight, estimates of weight become unreliable if based on volume flow. This is the case with liquids having included gases or with liquids having varying mixing ratios as regards the component substances having different specific weights, also in the case of bulk materials whose weight per unit of volume depends both on the specific weight of the component bodies and their size and shape. In such a case where the uncertainty in weight determination using volume flow becomes excessive, instead use is made of a method, already known, whereby the flow is collected in a weighing vessel for a certain period of time, after which the quantity collected is weighed and discharged from the weighing vessel, whereupon the operation is repeated. This is consequently an intermittent process and in order not to interrupt the flow completely use is often made of two weighing vessels which function alternately between which the flow is guided. However such an intermittent procedure becomes complicated as regards control. In the event of the said duplication of the equipment, furthermore the apparatus becomes extremely complicated and requires considerable space.

The aim of the present invention is to provide a method and a system for weighing the flow of material which permits a continuous flow to and from the weighing equipment without it being necessary to duplicate the latter.

The aim of the invention is achieved by carrying out the method as described as follows: The flow is supplied to a container connected to a weighing apparatus. The weight of the material collected in the container is determined by weighing, after which the container is emptied and a new quantity of material arriving by means of the flow is collected, and so on. The material is supplied to the container essentially continuously as the material flow proceeds and thus also during the emptying of the container. Emptying takes place so much faster than the supply of material that a considerable reduction in level is encountered during emptying. Weighing takes place essentially during entire filling periods so that a series of readings, each one representing a filling operation, is obtained which are supplied to a computer. The computer is designed so that having the series of readings for the filling operations as a basis it can determine corresponding series of calculated, probable readings for the emptying periods, by means of which it is possible to determine approximate values regarding the mass of the material supplied during the weighing operation. The system is such that it includes a supply apparatus for supplying the material flow to the container and an emptying apparatus, which latter is designed to be controlled by the computer.

The appended drawings illustrate an embodiment of the invention.

The system which will now be described is suitable for use in conjunction with milk production. Milk is precisely a substance the specific weight of which is difficult to establish under dynamic conditions because of air inclusion and consequently foam formation. The use of machine milking contributes towards the inclusion of air as a result renders conditions more difficult. As a result of the said difficulties in obtaining practically applicable methods for weighing, using equipment known hitherto, it has been deemed sufficient to employ volumetric measurement during the production of milk. This however has given unreliable results, which have not given correct values for the quantity produced, either totally or per cow, or the changes in the flow as a function of time during a milking operation. However, the equipment described is capable of use with all types of liquids where there is a need for continuous weighing. The fundamental principle of the method is also applicable to the flow of bulk material and for certain gases. For this purpose however the system must be subjected to certain modifications.

Figure 1:
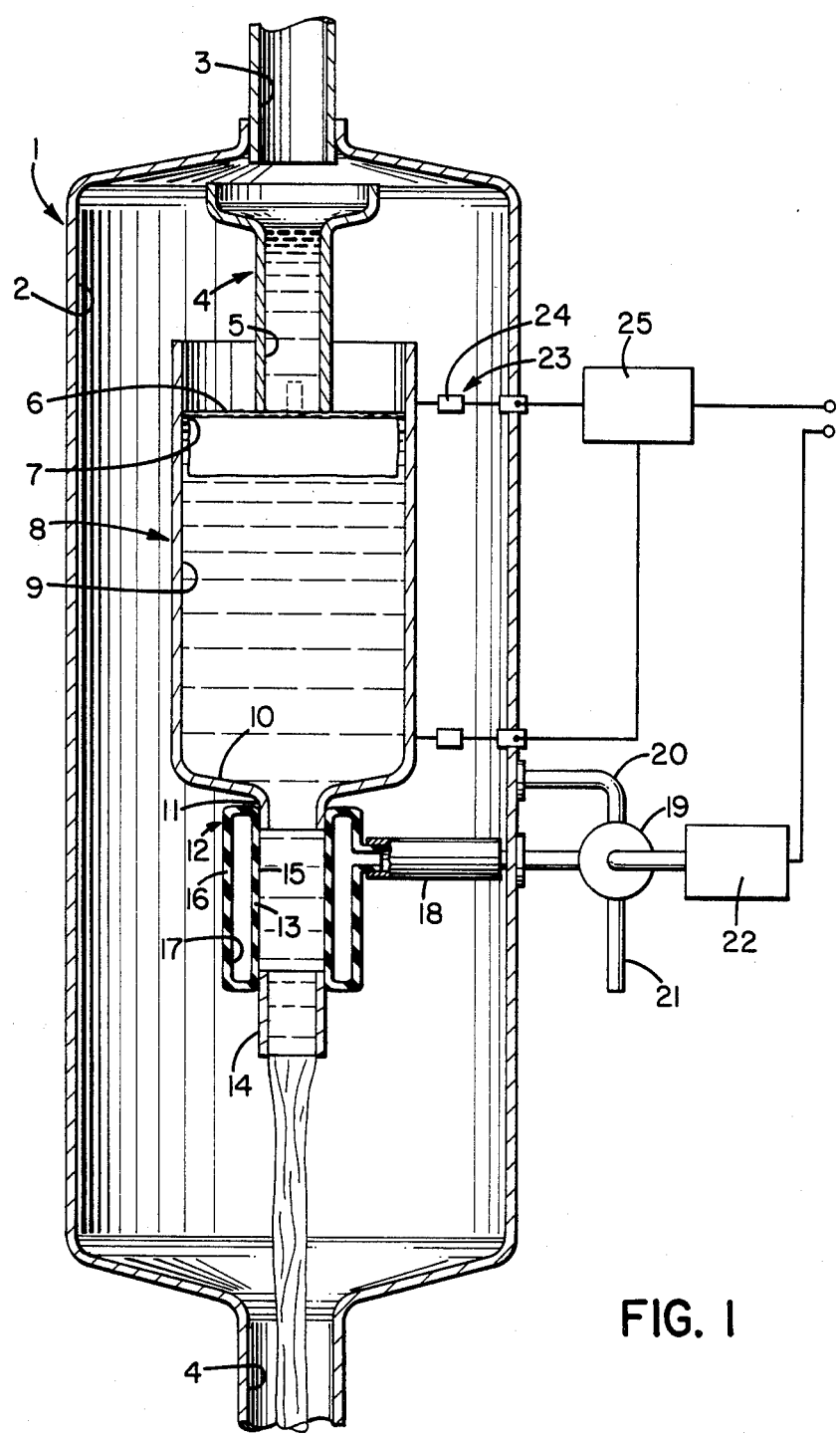
FIG. 1 shows a section through the apparatus in accordance with the invention.

FIG. 1 shows in section an apparatus in accordance with the invention. As mentioned, this is designed for weighing a flow of liquid. The apparatus comprises an outer casing 1 having a chamber 2 with an inlet 3 and an outlet 4. Inside the inlet 3 there is a compensating vessel 5 which is open at the top and at the bottom opens out above a liquid distributor 6. The liquid distributor 6 has a periphery 7 over which the liquid can flow.

Underneath the vessel 4 a weighing vessel 8 is situated. This is open at the top and the periphery 7 of the liquid distributor 6 connects with the inner wall 9 of the weighing vessel. The periphery of the liquid distributor follows, in the form of a narrow gap, the inner wall of the weighing vessel. The weighing vessel is preferably cylindrical and in this case the liquid distributor has a periphery in the form of a circle, the diameter of which is somewhat less than the diameter of the inner wall of the weighing vessel. The liquid distributor 6 is so arranged that the liquid flows towards the inner wall 9 of the weighing vessel in such a way that the flow of fluid does not cause any force components which are essentially directed upwards or downwards. It is advisable that the surface of the liquid distributor be provided with grooves, protuberances or the like so as to retard the flow of liquid to reduce the velocity.

At the bottom the weighing vessel 8 is provided with a base 10 from which a discharge tube 11 extends. The discharge tube is provided with a valve which can be changed over between the closed position, in which the incoming liquid is collected in the weighing vessel, and the open position in which the liquid can flow out of the weighing vessel and further through the exit 4 of the casing 1. The valve illustrated in FIG. 1 consists of an elastic sleeve with an inner wall 13 which is pushed onto the outlet tube 11 and an end tube 14. Thus a free zone 15 is formed in the sleeve between the two tubes 11 and 14. The inner wall 13 is joined to an outer wall 16 which does not however need to be elastic. A chamber 17 is formed between the two walls. A very flexible hose, by means of which a pressure medium is directed into the chamber 17 so that the elastic inner wall 13 can be clamped together and terminate the flow, leads to this chamber. When the pressure in the chamber 17 does not exceed the surrounding pressure, the inner wall 13 assumes the position illustrated in FIG. 1 and the valve is open.

As mentioned, the arrangement described is intended for weighing during milk production. When using milking machines the discharge channels from the udder cups which are attached to the cows' udders are subject to vacuum. Hence this vacuum prevails in the inlet 3 and, as the arrangement is provided with the casing 1, this vacuum can be maintained throughout the entire weighing system, i.e. in chamber 2. The casing also has the purpose of preventing contamination of the material from the surroundings and from splashes from the weighing system. Consequently a casing is desirable even if the pressure during the weighing procedures does not differ from atmospheric pressure. The inner wall 13 of the elastic, preferably rubber sleeve in the present case has a stiffness so matched to the vacuum in chamber 2 that the valve adopts the closed position if atmospheric pressure prevails in chamber 17. A control valve 19 which is connected to the hose 18, to the chamber 2 via a pipeline 20 and to atmosphere via an inlet 21 is provided to control the valve 12. The control valve is adjustable by means of an electromagnet 22. By this means it can on the one hand assume a position in which the chamber 17 is connected via the hose 18 with atmosphere of the inlet 21, so that the atmospheric pressure in chamber 17 which is higher as compared with the pressure in chamber 2 causes the valve to close, or also the control valve 19 can connect chamber 17 with chamber 2 via the hose 18 and pipeline 20. As a result the same pressure prevails on both sides of the elastic inner wall 13 and the valve assumes the open position illustrated in FIG. 1. If the system should be so designed that vacuum does not prevail in chamber 2, the inlet 21 can be connected to a source of pressure for introducing a medium under pressure. Other arrangements are also feasible for providing a positive pressure in chamber 17 in order to close the valve. Other valve arrangements are also feasible in the present case, for example a magnetic valve can be provided directly on the flow tube 11.

The weighing vessel 8 is suspended in such a way that its instantaneous weight can be recorded. In the embodiment (FIG. 1) the weighing vessel is mounted in two leaf springs 23 provided with wire strain gauges 24. By this means, in a known manner, the weight which is imposed on the weighing vessel can be measured by electronic means. However for such weight recording a large number of possible arrangements are available to a person skilled in the art and wire strain gauges have been selected merely as one example. It is presupposed however with the method and apparatus in accordance with the present invention that the result of the weighing operation is accomplished in the form of an electrical value and that some form of electrical transmitter must thus be present in the system. When the contents of the weighing vessel are to be weighed, taring for the intrinsic weight of the weighing vessel has to be carried out in a customary manner.

Figure 2:
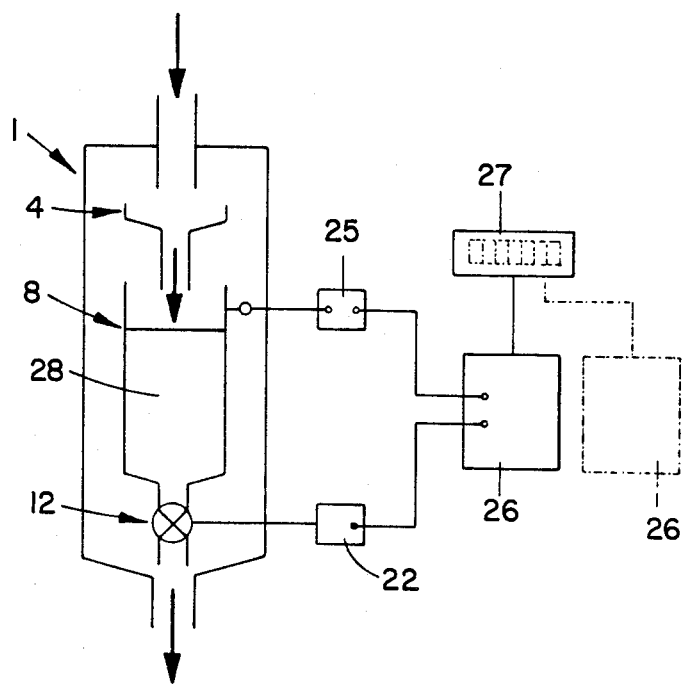
FIG. 2 shows a block diagram of the weighing apparatus.

FIG. 2 illustrates the system in the form of a block diagram. On the left are shown the mechanical and hydraulic equipment described above, such as the casing 1, the collection vessel 4, the weighing vessel 8 and the valve 12. On the right of the diagram are shown the electronic equipment of the system. This includes a weight transmitter which has been given the general designation 25, the active portion of which is thus represented in FIG. 1 by the wire strain gauges 24. In addition the diagram shows the control magnet 22 for valve 12 and a computer unit 26 for processing the signals received from the weight transmitter 25. In turn the computer unit is connected to some form of display and/or recorder 27 for indicating the reading which have been obtained or calculated and which are of interest in this context such as the weight values. If several weighing devices are designed to operate simultaneously, furthermore a connection is required so that the specific flow together with the total flow from all the devices can be read off. Since in connection with milk production equipment it is desirable to be able to read off the specific flow from each cow, several weighing systems should be provided and these should then be connected to a common computer for the simultaneous processing of these signals, or be connected via separate computers to a common display and preferably also recorders (indicated in FIG. 2).

The mode of operation of the system, and hence of the method, will now be described by reference to the illustrations and to the diagrams in FIG. 3-7. As previously indicated, the description relates primarily to a milking procedure, but is applicable in its essential parts also to other operations.

Figure 3:
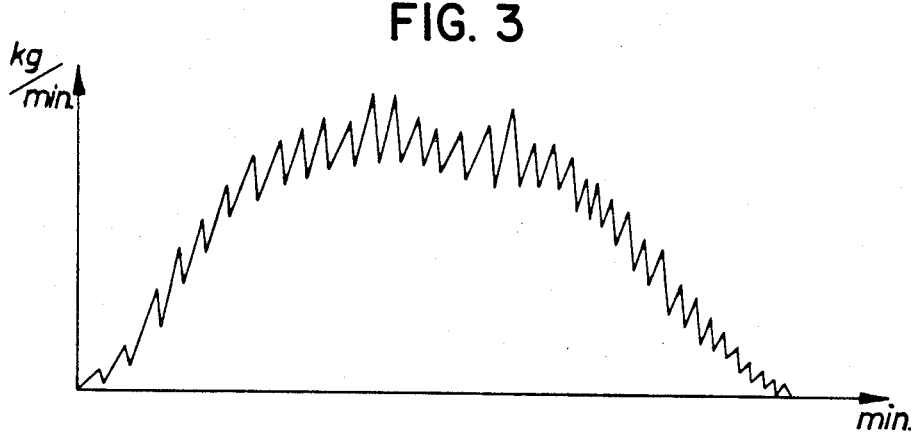
FIGS. 3-7 show diagrams which illustrate the weighing operation.

As is known, milking takes place by subjecting the cows udders by means of udder cups to a frequency of about 1 Hz and the milk is fed to the vacuum system in the form of short jets of liquid. The diagram in FIG. 3 shows how the mass per unit time of liquid flow (kg/min) varies with time (min). As indicated by the diagram, initially an ever-increasing quantity of milk is produced per unit time which after a maximum then reduces until milking ceases. The total quantity of milk comprises the integral of the curve shown. The curve corresponds essentially to the flow through the inlet 3.

Figure 4:
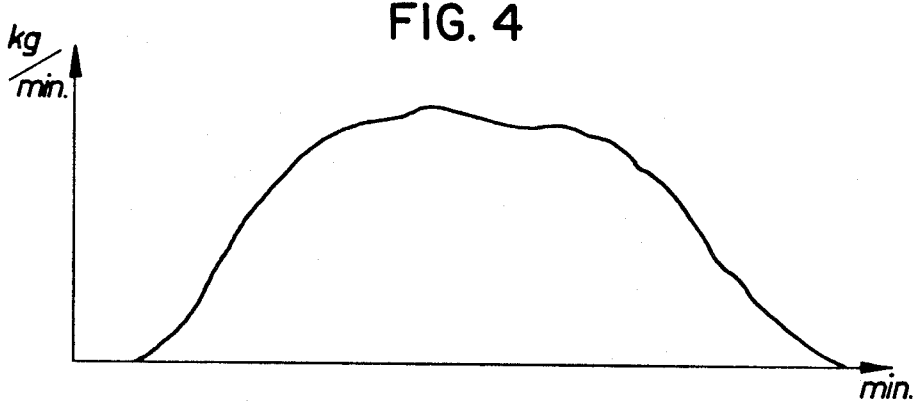

The milk which arrives in pulse fasion is collected in the compensating vessel 4 and at the same time leaves through the discharge appertures at the periphery of element 7. With the increase in quantity of liquid per unit time, the level of the liquid in the compensating vessel rises, then again reducing, so that the compensating vessel is empty directly after milking has ceased. Hence there is a discharge from the compensating vessel and a corresponding inward flow to the weighing vessel 8 which provides an average for the curve shown in FIG. 3 but displaced forwards somewhat in time because of the delay in the compensating vessel. If one requires good averaging of the liquid pulses from the milking mechanism, the limiting frequency of the compensating vessel, as a low-pass filter, must be chosen firstly with respect to the frequency of the milk pulses and secondly to the frequency content of the ideal average curve for the normal case. This means that the compensating vessel must not have too large a horizontal area because then it is possible to encounter such smoothing of the curve that an almost straight curve is obtained for the inward flow for a major portion of the inward flow period. In the present case it is assumed that the compensating vessel has a shape and volume such that smoothing of the curve in accordance with that shown in FIG. 4 is obtained.

Gradually as the milk flows outwards from the compensating vessel, if the valve 12 is closed, it starts to increase the volume in the weighing vessel 8. As already mentioned the outward flow to the weighing vessel should be so arranged that the weighing vessel is affected to the least possible extent by dynamic forces. Hence the value from the transmitter 25 should provide a correct indication of the instantaneous weight quantity in the weighing vessel. When the quantity in the weighing vessel has reached a maximum level, the valve 12 which has hitherto been closed is opened. As mentioned previously this is performed by means of an impulse to the control magnet 22. When most of the liquid in the weighing vessel has been discharged through the valve and continued outwards through the outlet 4 for subsequent transportation, e.g. to a collection tank, the valve is closed and re-filling of the weighing vessel starts again until its predetermined level is reached when the valve again opens, etc. The method does not presuppose that a certain level has to be reached, considerable variations being possible. Naturally the level must not exceed the position of the distributor 6 on the compensating vessel 4. Emptying also does not need to be absolutely complete, and instead a small volume can remain in the weighing vessel when the valve closes. This means that precision in valve control does not need to be so stringent. Control can be undertaken mainly in two ways. Either there is regular, periodic time control so that the valve is kept closed and open for certain periods. The inflow and outflow should here be so matched that the discharge periods are shorter than the inlet flow periods, preferably considerably shorter, e.g. with a ratio of 1:10. The computer 27 is provided to carry out this time control. If regular time control is employed, then with varying inflow differing levels can be encountered when emptying starts and small volumes can also be left behind after the emptying process.

Alternatively the valve can be controlled as a function of the weight imposed on the weighing vessel. When a certain maximum weight is achieved the valve consequently opens. If there is at least some indication of the specific weight of the liquid, then relatively high constancy in the level is obtained when emptying takes place. Analogous with this the valve can be controlled so that it closes when the weight indicates that the vessel is empty. If the maximum level is held constant and the viscosity of the liquid does not change, for a certain item of equipment the emptying times are changed only as a result of the magnitude of the simultaneous inflow.

Figure 5:
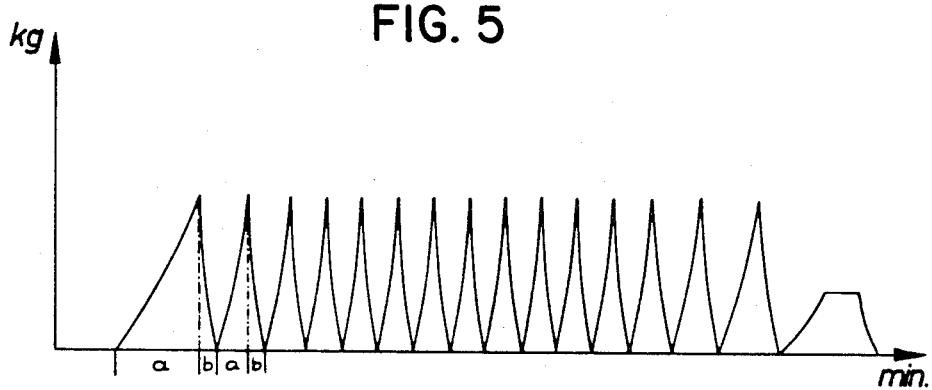
Figure 6:
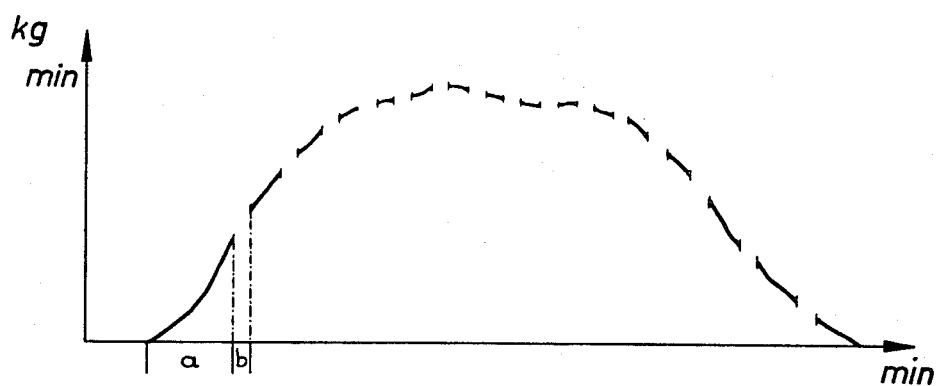

During this alternating filling and emptying of the weighing vessel a weight value is obtained from the transmitter 25 of the form shown in FIG. 5. This curve shows the instantaneous mass in the weighing vessel (kg) and takes as a basis the second method with fixed weight values at the start of emptying. This curve thus comprises a number of weighing periods (a) during which filling takes place with intervening periods of time (b) during which emptying takes place with simultaneous filling since the inward flow occurs without interruption. Since the curve has its origin at the start of emptying at a certain weight value, the filling periods (a) will vary in length because the inward flow is not constant. Thus the filling periods become longer towards the ends of the curve than with the greater flow in the centre of the curve. When the milking operation is terminated it may occur that the residual amount is not sufficient to fill up the vessel for the last time. In such a case the computer should be designed to empty the vessel if the value remains constant for a certain period of time. This is indicated by a straight line at the end of a curve. The weight value which can be recorded during the emptying periods is not of any interest, because it does not provide a correct indication of the weight of the material which has flowed through the system during the emptying period (b). During the weighing periods (a) however the curve obtained represents a significant sampling of the true flow fed to the weighing vessel during this period. This significant sampling data is incorporated in the memory of the connected computer for further processing. Here calculations are made primarily of the time derivatives of the sampling curve portions, whereby the measured values are obtained as shown in FIG. 6. By suitable further programming of the computer it is now possible inter alia, to undertake the following checks and supplements of the derivative curve as shown in FIG. 6.

Integration of the derived value during a sampling period and comparison with the measured weight increase during the sampling period. If deviations have occurred, the derived data is correspondingly corrected.

Interconnection of the curve portions of the sampling periods by application of built-in continuity criteria. These are determined by low-pass characteristic of the compensating vessel, the derivatives of the main components of different orders, etc.

Calaculation of various data of interest in this context, e.g. total weight, the time derivatives of the flow, etc. FIG. 6 illustrates the appearance of the partial curves for the weighing (a) after derivation. Hence these curved portions represent the rate of filling in mass. The integral of the curve for the added time (a) provides the weight which is supplied to the weighing vessel during these time periods. The cumulated integral of the curve in FIG. 6 thus provides only a partial weight for the total mass flowing through, because no information is available regarding the mass flow during the emptying periods.

To be able to obtain a correct presentation of the instantaneous mass quantities and the total mass flowing through during the operation a curve is required which corresponds to the curve in FIG. 4. The way in which this can be achieved has been outlined fundamentally above. In accordance with the invention the computer 26 is thus arranged to transform the curve in accordance with FIG. 6 into a curve which closely resembles the curve in FIG. 4. The portions of the curve in FIG. 6 which are located within the measuring perios (a) must thus be linked with curve portions which cover the emptying periods (b). Each of the curve portions within the periods (a) denotes the specific mass flow for each moment of the filling operation and this specific mass flow is calculated by the computer for each filling period (a) taking as a basis the recorded successive increase in weight on the part of the measuring vessel. Since measurements are thus being made of the increase in weight, and not of the accumulated weight at each moment, the magnitude of the weight at the start is unimportant. In other words it is not necessary to ensure that the measuring vessel is empty when the next measuring period starts. This is important because in such a way there is not only less need for precision in the control process, but also because the amounts of liquid remaining behind on the vessel walls exercise no effect.

In order to complete the curve the computer is designed to extrapolate a curve for the immediately preceding measuring period (a) so that the curve bridges the emptying period (b). Furthermore smoothing can take place so that the extrapolated curve joins the starting point of the curve for the next measuring period. If the change in the flow volume takes place relatively slowly, the latter-mentioned step is not likely to be necessary.

Figure 7:
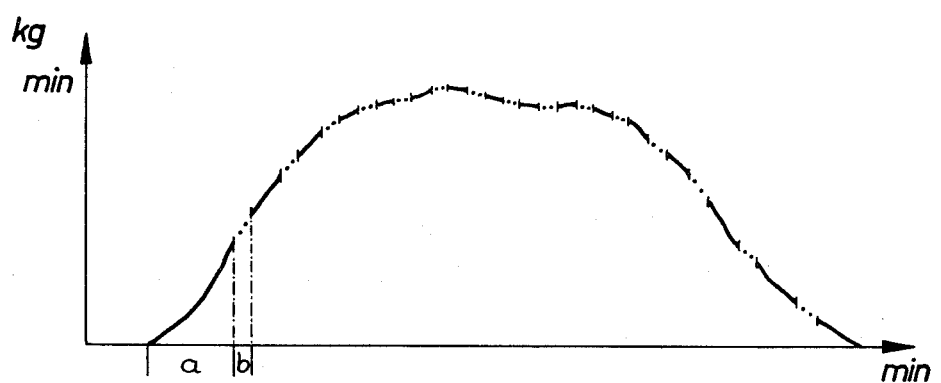

FIG. 7 shows the appearance of the final curve. Here the curve portions plotted during the measuring period are denoted by solid lines whilst the extrapolated portions are indicated by dotted lines. As can be seen, this curve approximates very closely the curve shown in FIG. 4. From this curve it is possible to read off the magnitude of the instantaneous mass flow for each moment and, by integration of the curve, it is possible to obtain the total amount by weight during a certain period of time or during an operation which has terminated.

No detailed account will be given here of the way in which the computer should be set up in order to provide the said extrapolation. However, by way of example it can be mentioned that with a digital method of measurement the digital values can be successively added to the value which has been previously summated in step with the increase in the weight during the measuring periods. Thus the specific amount of the mass flow is obtained by way of the number of weight units which are added for each time unit (the curve shown in FIG. 6 is obtained). Extrapolation can then take place by setting up the computer so as to continue the addition also during the emptying periods and then at the same rate which formed the termination of the measuring period immediately prior to this (shown in FIG. 7) or possibly in accordance with an average of the addition within the same. In the event of reducing flow (right-hand portion of the curve) the same method is used, but subtraction is employed instead of addition.

As a result of the data processing of the incoming weight values which occurs several functions can be determined for the mass. In many instances the most important value is likely to be the value of the total weight during a certain weighing operation, as stated in the preamble. However there can likewise be reason to determine and to print out values comprising various differential and integral values for the weighing operation which is in progress or has been terminated. For example it is often useful to obtain a value for the specific mass flow such as the weight per unit time and the change in this value during the weighing operation.

Finally it should be mentioned that the compensating vessel which is provided so that so as to prevent excessive oscillations in the system if the incoming flow is uneven can be replaced by other arrangements. Thus an electrical low-pass filter can be employed for averaging of the incoming measured values and the weighing vessel can hence be permitted to oscillate. An uneven incoming flow can also be smoothed out by damping the weighing vessel using a mass or for example by hydraulic damping. Furthermore it should be mentioned that if there is no damping arrangement at all either up-stream of, in conjunction with, or downstream of the weighing vessel in the event of oscillations it is possible to obtain an average value for presentation by means of computer processing. On this point reference should be made to known programmes for determination of regression curves.

I claim:

1. A method for determining the weight of a fluid material by passing the same through a weighing apparatus having a single container provided with inlet and outlet means for receiving and discharging said material, comprising:

continuously directing said material into said container and periodically discharging the same from said container at a rate which exceeds the flow of material into said container, thereby to create successive collecting and discharge periods and causing the amount of said material in said container to change during collecting and discharge periods between a maximum weight at the end of each collecting period and a minimum weight at the end of each discharge period, weighing said container and its contents during collecting periods to obtain a series of values related to the increase of weight of the material during said periods and the length of said periods and the weight at the end of said periods immediately before the start of said discharge period, and converting signals corresponding to said related values to determine the total weight of fluid flow by adding estimated weight values during said discharge periods on the basis of increased weight values at the end of said collecting periods.

2. An apparatus for determining the weight of a fluid material in a container which is continuously filled and periodically emptied, comprising one single container for receiving the material to be weighed, weighing means connected to said container for weighing its contents, means for supplying in uninterrupted flow of said material to said container and for periodically discharging said material from said container, said supply and discharge means being so controlled that the rate of discharge exceeds the rate of supply, means connected to said weighing means and said discharge means to control said discharge means so that emptying of said container is inactivated during collecting periods and to produce instantaneous weight values during said collecting periods so that a series of values of material collected during said collecting periods as well as time-values for the collecting periods are generated, means responsive to said generated values to determine a corresponding series of estimated values during emptying periods to produce values reflecting the material flow and which together with the series of weight values of material collected during the collecting periods consequently represents the total mass during an entire weighing period.

3. An apparatus according to claim 2, wherein said means for supplying material to said container and discharging the same therefrom is so arranged as to produce a smooth flow of material substantially without oscillation.

4. An apparatus according to claim 2, and in particular for use in vacuum-type milking operations, wherein said container, supply and discharge means are enclosed in an air-tight casing connected to a source of vacuum.

* * * * *